United States Patent
Stec

(10) Patent No.: US 9,743,001 B1
(45) Date of Patent: Aug. 22, 2017

(54) METHOD OF STABILIZING A SEQUENCE OF IMAGES

(71) Applicant: FotoNation Limited, Galway (IE)

(72) Inventor: Piotr Stec, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/048,149

(22) Filed: Feb. 19, 2016

(51) Int. Cl.
*H04N 5/228* (2006.01)
*H04N 5/232* (2006.01)

(52) U.S. Cl.
CPC ....... *H04N 5/2329* (2013.01); *H04N 5/23258* (2013.01); *H04N 5/23267* (2013.01); *H04N 5/23287* (2013.01)

(58) Field of Classification Search
CPC ............. H04N 5/2329; H04N 5/23267; H04N 5/23287; H04N 5/23258
USPC .................. 348/208.99, 208.1–208.8, 208.11
See application file for complete search history.

(56) References Cited

U.S. PATENT DOCUMENTS

2015/0262344 A1  9/2015  Stec et al.
2016/0360111 A1* 12/2016  Thivent .............. H04N 5/23287

FOREIGN PATENT DOCUMENTS

WO    WO2014005783    1/2014

* cited by examiner

*Primary Examiner* — Yogesh Aggarwal

(57) ABSTRACT

A method operable within an image capture device for stabilizing a sequence of images captured by the image capture device is disclosed. The method comprises, using lens based sensors indicating image capture device movement during image acquisition, performing optical image stabilization (OIS) during acquisition of each image of the sequence of images to provide a sequence of OIS corrected images. Frame-to-frame movement of the device for each frame during which each OIS corrected image is captured is determined using inertial measurement sensors. At least an estimate of OIS control performed during acquisition of an image is obtained. The estimate is removed from the frame-to-frame movement determined for the frame during which the OIS corrected image was captured to provide a residual measurement of movement for the frame. Electronic image stabilization (EIS) of each OIS corrected image based on the residual measurement is performed to provide a stabilized sequence of images.

2 Claims, 5 Drawing Sheets

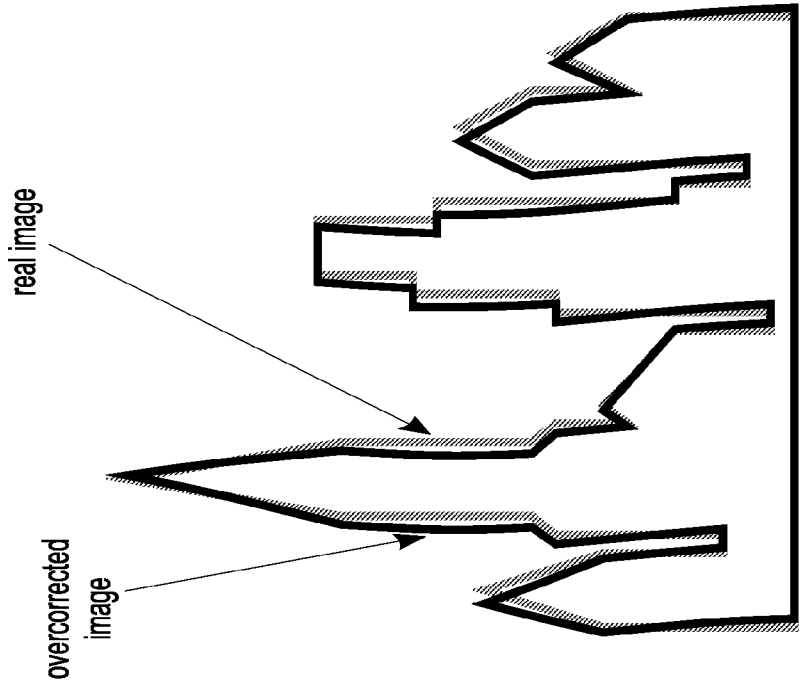
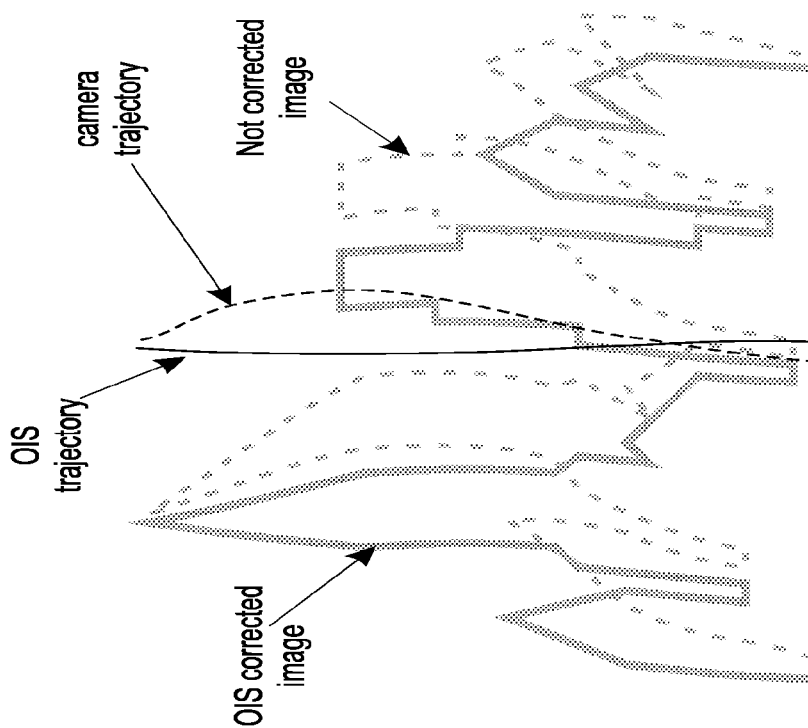
Fig. 2(b) OIS + gyroscope
Fig. 2(a) OIS only

METHOD OF STABILIZING A SEQUENCE OF IMAGES

RELATED APPLICATION

The present application relates to co-filed application Ser. No. 15/048,224 entitled "A Method for Correcting an Acquired Image", filed Feb. 19, 2016, the disclosure of which is incorporated herein by reference.

FIELD

The present invention relates to a method of stabilizing a sequence of images.

BACKGROUND

Optical Image Stabilization (OIS) is a mechanism used in a still camera or video camera that stabilizes the recording of an individual image by varying the optical path to the sensor during image acquisition. This technology can be implemented within a lens or by moving the sensor as the final element in the optical path. The key element of all optical image stabilization systems is that they stabilize the image projected on the sensor before the sensor converts the corrected image into digital information.

Referring to FIG. 1, for example, Nikon and Canon's implementations of OIS work by using a floating lens element that is moved orthogonally to the optical axis of the lens using electromagnets, by a lens shift distance. Vibration is detected using two piezoelectric angular velocity sensors (often called gyroscopic sensors), not shown, one to detect horizontal movement and the other to detect vertical movement. When a camera is rotated as shown in FIG. 1, OIS compensates for the object motion caused by the camera rotation by shifting the lens barrel in order to maintain object position on the sensor. This type of compensation has its limitations: the optical image stabilizer corrects only for pitch and/or yaw axis rotations, and does not correct for rotation along the optical axis and as such, changes in perspective projection, caused by the camera rotation, are not compensated or perspective distortion can result from the correction applied; also the range of the correction provided by OIS is usually limited. Thus, as illustrated in the example of FIG. 2(a) where if a camera moves significantly during image acquisition, only a portion of this movement will be compensated leaving a distorted OIS corrected image. Note that the form of distorted image shown is caused by varying yaw movement during capture of an image using a rolling shutter.

Application of OIS is still popular due to fact that it can actively reduce the amount of motion blur in the final image due to fact that lens is following the motion of the image during image exposure time, keeping the center of the frame steady (within limits) on the sensor surface.

Electronic Image Stabilization (EIS) involves shifting images from frame to frame of video, enough to counteract inter-frame motion. EIS can be based only on frame-to-frame image analysis, using pixels outside the border of the visible frame to provide a buffer for motion. This technique reduces distracting vibrations within videos by smoothing the transition from one frame to another. This technique does not affect the noise level of the image, except in the extreme borders if the image is extrapolated. It cannot do anything about existing motion blur, which may result in an image seemingly losing focus as motion is compensated.

However, this approach has its own problems as it can become unreliable in certain situations (lack of details, large moving objects, and repetitive patterns).

Some forms of EIS are supplemented with measurements of camera motion provided by camera inertial sensors (IMU). In that case, knowing the camera intrinsic properties, the motion in the sensor plane can be recreated and filtered in order to provide a stable video sequence, albeit with potentially camera motion blurred images.

Note that OIS and EIS stabilizations, especially those based on IMU external to the lens, are not used together. This is because OIS introduces image motion that no longer correlates with the camera motion. For example, let us assume that OIS is correcting 20% of camera shake. An IMU-based EIS stabilization would have no information about this correction and would attempt to compensate for 100% of the camera shake. This results in overcorrection that is visible in the resulting video as a residual camera shake. This shake is particularly visible as it does not follow natural motion patterns. This situation is illustrated by FIG. 2(b) which shows the correction applied according to camera trajectory on an image that was already partially corrected by OIS. Instead of straight objects, we get objects bent in the opposite direction.

SUMMARY

According to the present invention there is provided a method of stabilizing a sequence of images according to claim 1.

Embodiments of the present invention combine inertial Electronic Image Stabilization (EIS) with Optical Image Stabilization (OIS) to provide improved image quality within a video sequence.

BRIEF DESCRIPTION OF THE DRAWINGS

Embodiments of the invention will now be described, by way of example, with reference to the accompanying drawings, in which:

FIG. 2(a) shows correction with OIS leaving some motion and rolling shutter artefacts in an image; and FIG. 2(b) shows over-correction of an image when IMU based EIS is applied to an OIS corrected frame;

DESCRIPTION OF EMBODIMENTS OF THE INVENTION

Figure 1A:
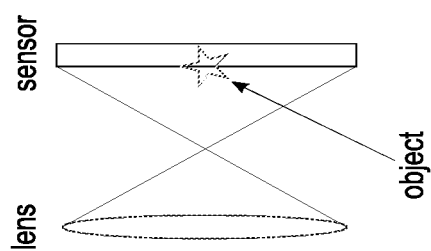
FIGS. 1(a), 1(b) and 1(c) illustrate a sequence of camera movements and OIS lens compensation movements employed with a conventional OIS controller.
Figure 1B:
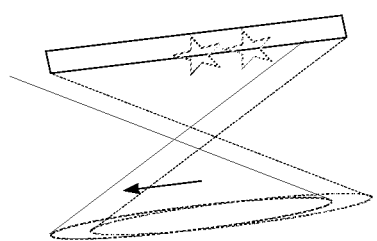
Figure 1C:
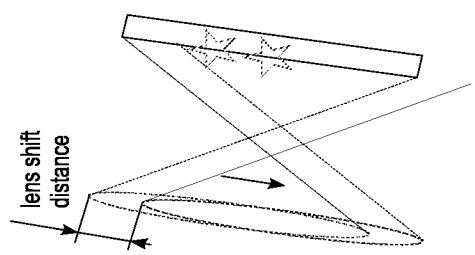
Figure 3:
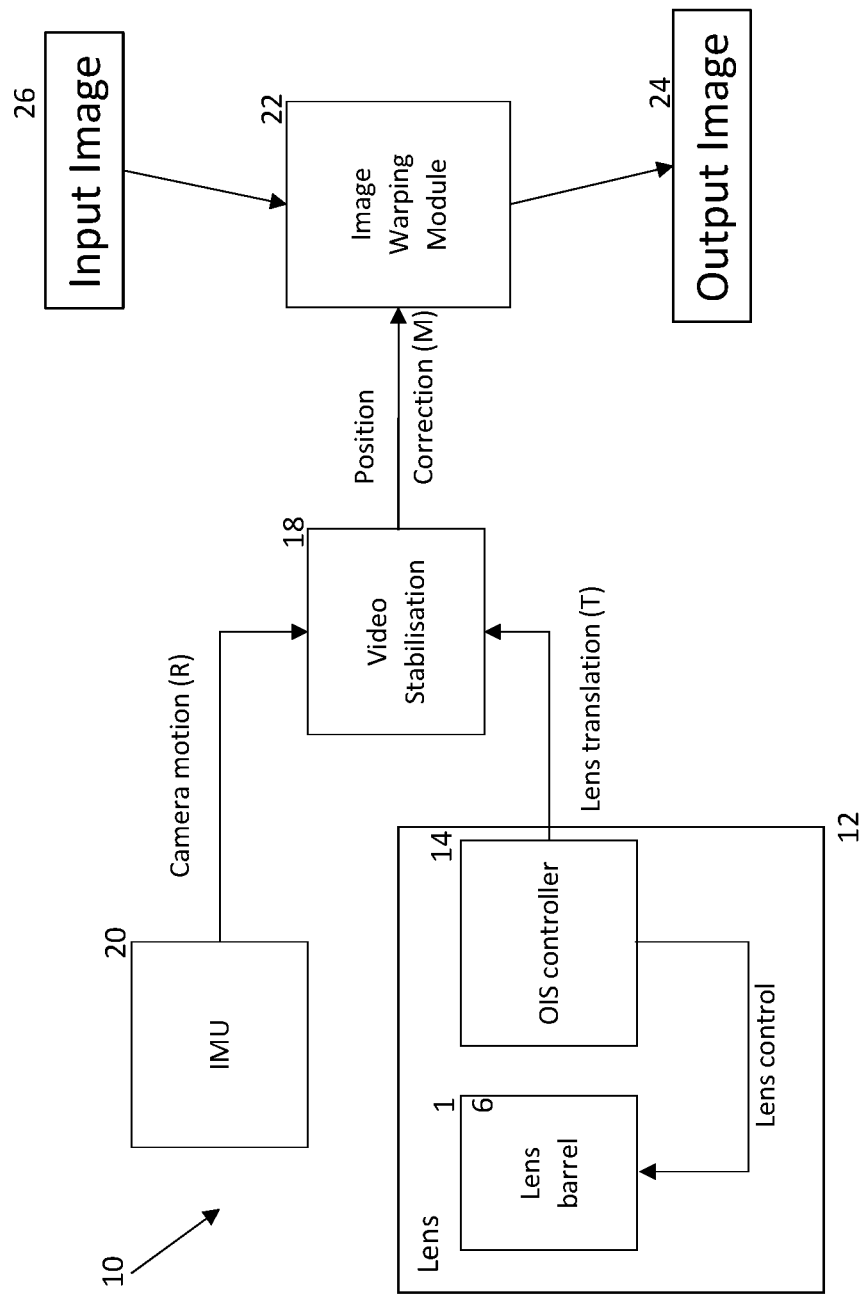
FIG. 3 illustrates an image acquisition device performing video stabilization using camera motion and lens position information according to a first embodiment of the present invention.
Figure 4:
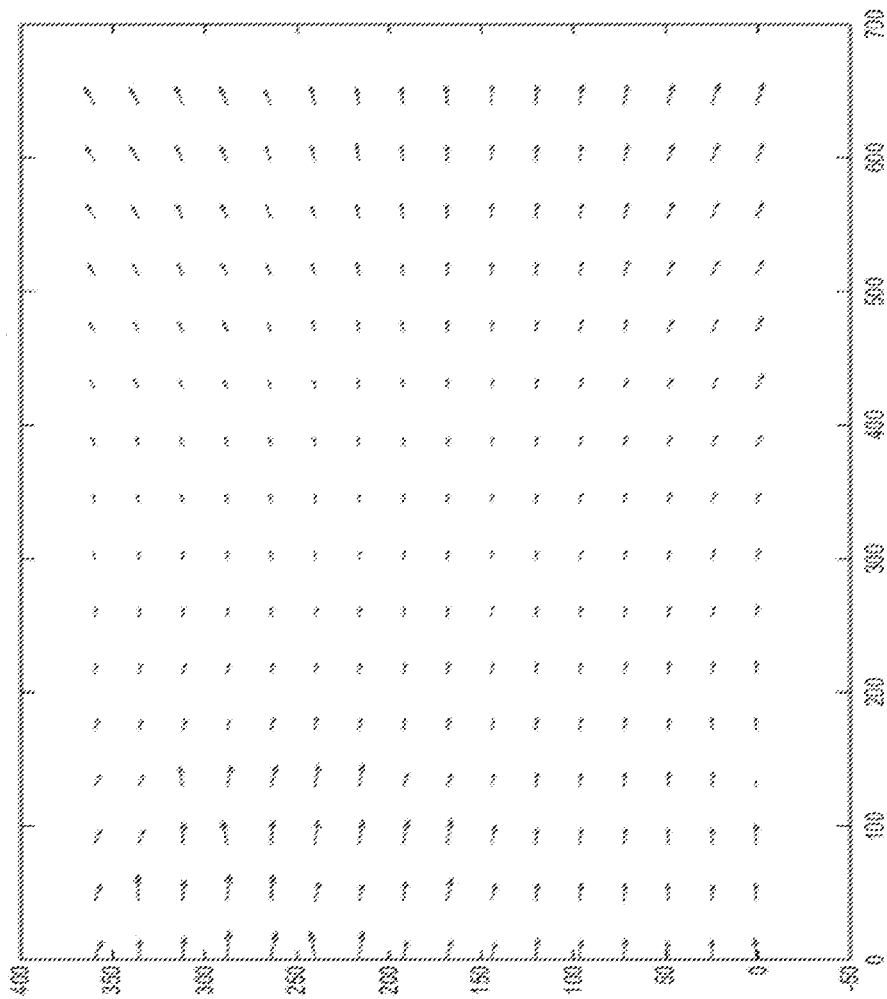
FIG. 4 illustrates an exemplary OIS compensation map T indicating lens motion during image acquisition employed in the embodiment of FIG. 3.

Referring to FIG. 3, which illustrates an image acquisition device 10 according to a first embodiment of the present invention. The device 10 includes a lens 12 including an OIS controller 14 arranged to perform OIS control by moving a lens barrel 16 during image acquisition in a conventional manner. (In alternative implementations, the OIS controller 14 could equally move the image sensor (not shown).) The OIS controller 14 reports the movement of the lens (lens shift distance from FIG. 1) to a video stabilization module. In the embodiment, it is assumed that an image is read from the image sensor using a rolling shutter technique with each row (or group of rows) of an image being read successively from the image sensor. Thus, the x and y movement of the lens during image acquisition varies from row to row of the image as well as possibly along the rows of the image. The resultant record of lens movement can therefore be thought of as a matrix T[ ], with each cell indicating x, y movements for respective locations across the extent of an image. FIG. 4 shows such a matrix for a 360×640 image. Note that the resolution of the matrix T[ ] does not have to correspond with the image resolution. Also, note that the x,y components shown vary across rows of the image, however, this may not be the case if pixels of a row are captured simultaneously i.e. the components of T[ ] along any given row may be the same and in such a case, the matrix T[ ] could be represented as a Ax1 matrix, where A is the number of rows of the matrix.

Referring back to FIG. 3, the device 10 also comprises a set of inertial sensors (IMU) 20 and these produce a matrix R[ ] indicating the x, y and z movement of the device during frame acquisition. The IMU sensors 20 can comprise any combination of gyroscopic sensors, accelerometers and/or magnetometers indicating device movement during image sequence capture. Note that the x, y as well as z movements recorded by the IMU sensors 20 will be at least as large as those required by the OIS controller whose lens/sensors movements during image acquisition are limited; and also because image exposure only occupies a portion of frame time.

Note that it is important that the record of device movement R[ ] captured by the IMU sensors 20 be capable of being synchronized with the lens movement T[ ] recorded by the OIS controller 14. While it is not necessary that these be captured at the same spatio-temporal resolution, if the values are to be correlated accurately with one another, they need to be performed on the same time basis. Thus in some embodiments, the matrix T[ ] provided by the OIS controller is time stamped using the same timer used to generate timestamps for the IMU matrix R[ ]; or at least the timestamp sources are calibrated so that the matrices R[ ] and T[ ] can be correlated with one another. In other embodiments, a common clock signal could be employed by each of the OIS controller 14 and the IMU sensors 20, but it will be appreciated that any synchronization technique can be used.

For embodiments, where it is known that OIS adjustment is made no more often than the time taken to acquire one row of an image at least no more often than the resolution of T[ ], then the matrix R[ ] can also comprise a Bx1 matrix, where B≥A of, with each cell indicating an x, y and z movement for a frame.

In any case, each of the movement matrices T[ ] and R[ ] are fed to a video stabilization module 18. In one embodiment, the video stabilization module 18 uses the matrix R[ ] to calculate the amount of correction (local displacement in the sensor plane) required for video stabilization based on the camera orientation change with respect to orientation in the previous frame.

The video stabilization module 18 then subtracts the lens barrel shift amount indicated by the matrix T[ ] to provide a final correction matrix M[ ]. This is done to remove the correction already applied by the OIS controller 14, as not subtracting it from the correction calculated using IMU data will lead to overcorrection.

The video stabilization module 18 provides the final correction matrix M[ ] to an image warping module 22 in order to produce a stabilized output frame 24 based on the OIS corrected input image 26 corresponding to the matrix T[ ].

More formally, knowing the camera intrinsic matrix K:

$$K = \begin{pmatrix} f & s & x_o \\ 0 & f & y_o \\ 0 & 0 & 1 \end{pmatrix}$$

where f=focal length; $x_o$, $y_o$ are the principal point offsets; and s=axis skew, the final correcting transformation matrix M can be defined as follows:

$$M = KRK^{-1}T^{-1}$$

where R[ ] and $T^{-1}$[ ] have been normalized to correspond with one another.

Thus after inverting the correction T applied by the OIS controller 14, EIS based on a final correction (M) applied by the image warping module 22 can be performed without introducing distortion into the resultant output image 24.

Unlike the OIS controller 14 of the first embodiment, when an OIS controller does not provide information about lens position, a precise combination of OIS and IMU sensor based EIS stabilization is not possible.

Figure 5:
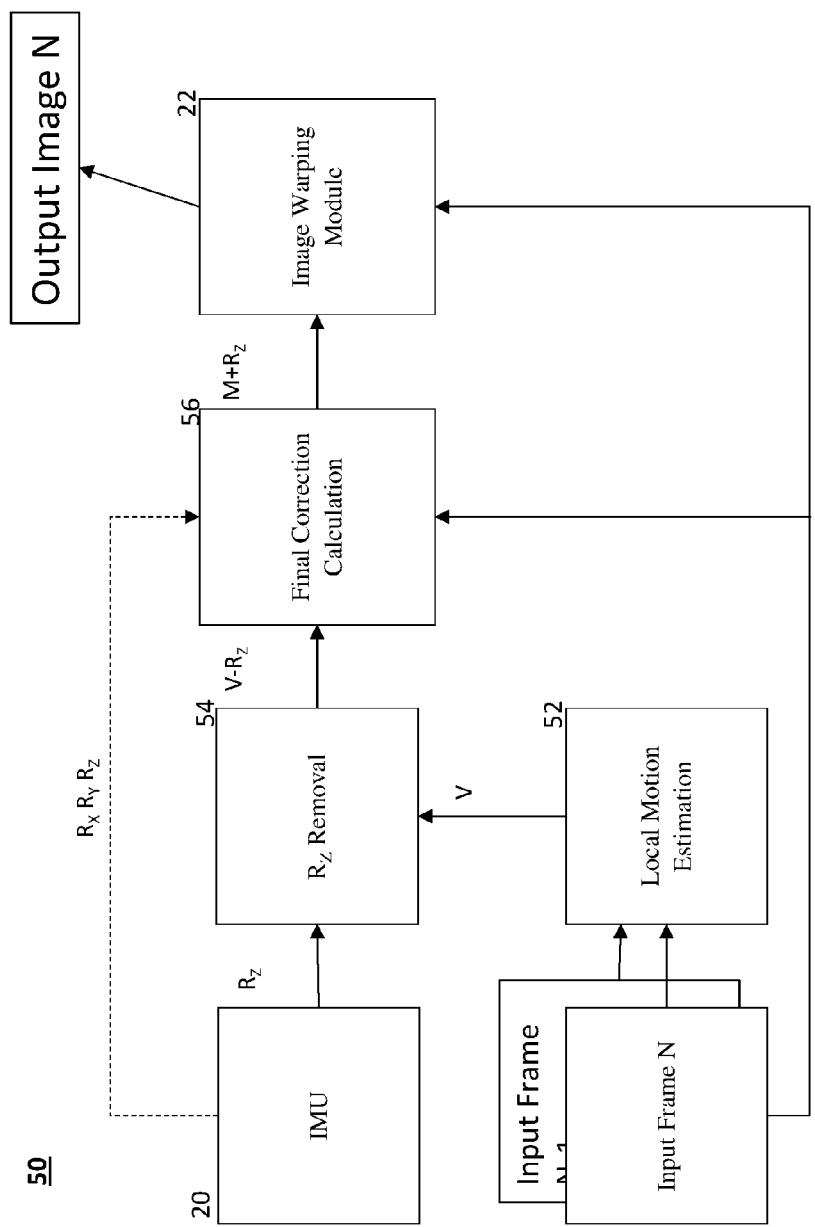
FIG. 5 illustrates an image acquisition device performing video stabilization with unknown OIS according to a second embodiment of the present invention.

Referring now to FIG. 5, in a second embodiment, an image acquisition device 50 recovers as much reliable information about camera movement during frame acquisition from its inertial sensors (IMU) 20 as possible and treats OIS stabilization being performed within a lens as a black box with unknown parameters. (Thus, the OIS controller is not shown in FIG. 5.)

The embodiment of FIG. 5 is based on the assumption that the OIS controller does not correct for rotations around the optical axis although it will be appreciated that variations of this embodiment could be readily adapted to operate with OIS controllers that did attempt to correct for such rotations. The embodiment of FIG. 5 is again based on the assumption that OIS correction is limited and that the extent of x, y (and possibly z) correction for movement of the camera is less than that recorded by the device IMU sensors 20.

As before, each input image frame . . . N−1, N . . . captured by the image sensor is already stabilized using OIS, but the level of stabilization is unknown. Note that because the OIS controller typically only uses inertial sensors, it is unaffected by the motion of objects that could be in the camera's field of view.

Nonetheless, a displacement map V[ ] estimating the frame to frame motion between any given input frame N and a preceding (or succeeding) frame N−1 can be determined, for example, as disclosed in WO2014146983 (Ref: FN-389) the teaching of which is incorporated herein by reference. This map can take a similar form to the displacement matrix T[ ] provided by the OIS controller 14 in the first embodiment, except that it represents the overall frame to frame motion for an image less the OIS correction performed by the controller within the image acquired during the frame.

Thus, this embodiment is based on knowing the overall frame to frame motion R[ ] from the IMU sensors 20 and combining this information with the displacement map V[ ] to extract an estimate of OIS correction applied across the image so that this can be removed before an image warping module 22, similar to that of FIG. 3, corrects the input image frame.

Again, the camera IMU sensors 20 provide information about actual camera rotation along all three axes ($R_X R_Y R_Z$) during frame acquisition. Where the OIS controller does not correct for rotation around optical axis (typically Z axis), correction for movement around this axis can be applied in full, by the image warping module 22, based on the gyroscope input.

Thus, before a position correction matrix is calculated, the Rz components of movement across an image can be removed from the displacement map V[ ] produced by the local motion estimation unit 52 by an $R_Z$ Removal block 54. After this, the motion field V-Rz[ ] will contain only motion in X,Y directions partially corrected by the OIS controller and containing outliers caused by the moving objects and estimation errors.

A final correction calculation module 56 calculates a residual correction matrix M[ ] using image analysis supported by the IMU sensor output $R_X R_Y R_Z$ by. In this case, $R_X R_Y R_Z$ are not applied directly to V-Rz[ ], but help in verification of the local motion vectors retrieved by the image analysis performed by the block 56 to extract the OIS controller motion component T[ ] from the V-Rz[ ] matrix. So for example, the final correction calculation block 56 can use IMU sensor output R[ ] to filter out any outlier vectors from the motion field V-Rz[ ]. The remaining vectors can then used to calculate the transformation matrix T[ ].

Once this matrix T[ ] has been generated, the residual correction matrix M[ ] can be generated as in the first embodiment to indicate the X,Y stabilization that needs to be performed across the image by an image warping module 22.

Because the rotation of the camera Rz was previously subtracted from the motion field, the final correction calculation block 56 adds this back to form the final transformation between two consecutive frames. This matrix M+Rz[ ] can be further filtered if required.

In summary, using the second embodiment, a motion field $V_I$ similar in form to that shown in FIG. 4 can be generated from a series of images that were stabilized using OIS. This stabilization is equivalent to shifting the image in the sensor plane in X, Y directions by unknown values by vector field T. At the same time using $R_X$ and $R_Y$ from IMU sensors 20 and knowing the camera intrinsic matrix K, we can recreate a reference X,Y motion field $V_R$. Each component of $V_R$ should be greater than the corresponding component of $V_I$ as the magnitude of $V_I$ components is reduced by the degree of OIS control and $V_I$ components are only generated during a portion of frame time.

Assuming a perfect motion field $V_1$ (no outliers or errors) the shift introduced by the OIS will be:

$$T = V_R - V_I$$

In the real situation, the $V_I$ field will contain outliers and as a result, vector field T will contain outliers. However, since the vector field T is a result of motion strictly in the image plane, all we need to find is the translation matrix with two independent parameters X,Y. By comparison, estimation of a homography matrix would require finding 8 or 9 independent parameters and is not only more complex but is also more prone to numerical conditioning and overfitting.

Assuming we are dealing with a rolling shutter camera, we need to find the translation value for each of the rows of vectors and interpolate intermediate values if needed. This will give the estimated trajectory T[ ] applied by the OIS controller.

The next step will be calculation of the correction values M[ ] using camera rotations obtained from IMU and lens projection parameters. From this correction we need to subtract the motion already corrected by the OIS (based on T motion field) to get the final correction.

Using the above embodiments, all calculations can be performed at any point in time allowing for the recovery of the camera trajectory T[ ] during the exposure time of the frame and as a consequence perform effective rolling shutter effect removal.

Incorporating the information from the IMU sensors 20 reduces the number of degrees of freedom during calculation of the residual correction matrix M[ ]. This helps in removing outliers from the original motion field and increases the reliability of estimated correction matrix.

In variants of the above described embodiments, measurements $R_X R_Y R_Z$ from the camera IMU 20, especially gyroscope signals, can be integrated as a function of the exposure time of the image frames as disclosed in co-filed application Ser. No. 15/048,224 to mitigate distortion caused by high frequency vibration of the camera and these signals can be used instead of the raw $R_X R_Y R_Z$ measurements in performing EIS as described above.

The invention claimed is:

1. A method operable within an image capture device for stabilizing a sequence of images captured by the image capture device, comprising:
    using lens based sensors indicating image capture device movement during image acquisition, performing optical image stabilization (OIS) during acquisition of each image of said sequence of images to provide a sequence of OIS corrected images;
    using inertial measurement sensors, determining frame-to-frame movement of the device for each frame during which each OIS corrected image is captured;
    obtaining at least an estimate of OIS controlled lens movement responsive to device movement during image acquisition with a lens system including an OIS controller providing, to a central processor of said image capture device, a record of OIS controlled lens movement applied during capture of each OIS corrected image;
    removing said estimate from the frame-to-frame movement determined for the frame during which said OIS corrected image was captured to provide a residual measurement of movement for said frame wherein said removing comprises transforming said frame-to-frame movement according to a camera intrinsic matrix and multiplying an inverse of said record of OIS control with transformed frame-to-frame movement to provide said residual measurement of movement; and
    performing electronic image stabilization (EIS) of each OIS corrected image based on said residual measurement to provide a stabilized sequence of images.

2. A method operable within an image capture device for stabilizing a sequence of images captured by the image capture device, comprising:
    using lens based sensors indicating image capture device movement during image acquisition, performing optical image stabilization (OIS) during acquisition of each image of said sequence of images to provide a sequence of OIS corrected images;
    using inertial measurement sensors, determining frame-to-frame movement of the device for each frame during which each OIS corrected image is captured;
    obtaining at least an estimate of OIS controlled lens movement responsive to device movement during image acquisition said obtaining including comparing a pair of successively acquired OIS corrected images provided by an image sensor to provide an estimate of frame-to-frame movement between said OIS corrected images, and subtracting frame-to-frame movement of the device using inertial measurement sensors from said estimated frame-to-frame movement to provide said estimate of OIS controlled lens movement performed during acquisition of an image;

removing said estimate from the frame-to-frame movement determined for the frame during which said OIS corrected image was captured to provide a residual measurement of movement for said frame;

performing electronic image stabilization (EIS) of each OIS corrected image based on said residual measurement to provide a stabilized sequence of images;

prior to removing said estimate, subtracting a measurement of frame-to-frame lens rotation from said estimate of frame-to-frame movement; and after removing said estimate, adding said measurement of frame-to-frame lens rotation to said residual measurement of movement for said frame.

* * * * *